F. X. MOERK.
PERPETUAL MONTHLY CALENDAR.
APPLICATION FILED APR. 30, 1918.

1,310,428.

Patented July 22, 1919.
3 SHEETS—SHEET 1.

WITNESS:
Rob't R. Ketchel.

INVENTOR
Frank X. Moerk
BY
Frank L. Busser
ATTORNEY.

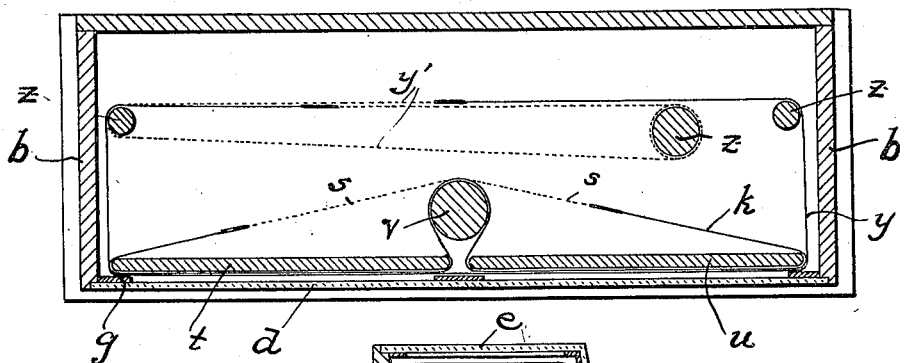
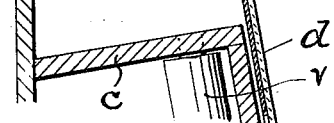
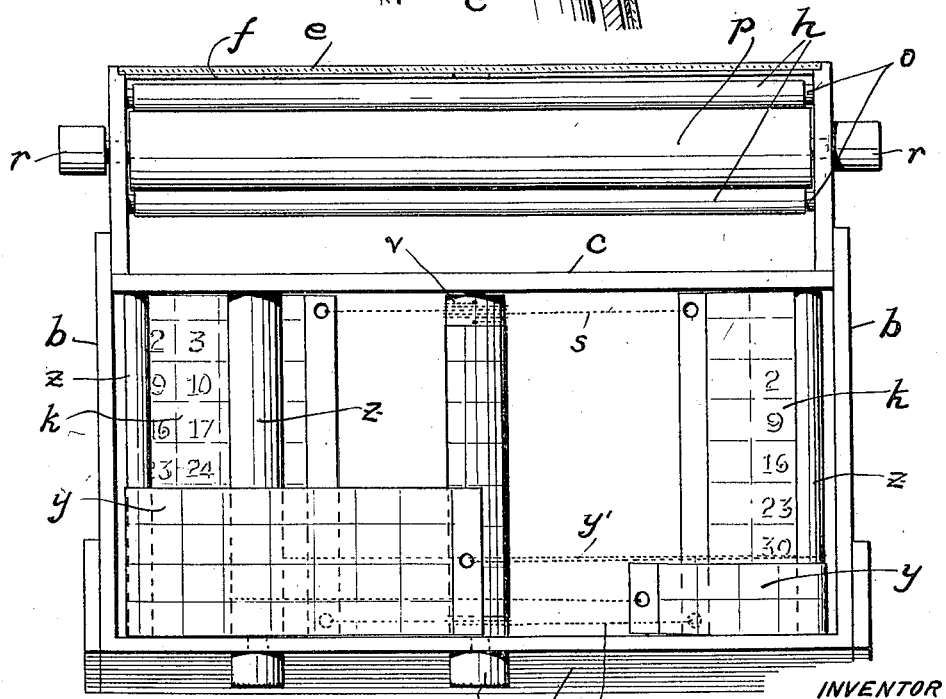

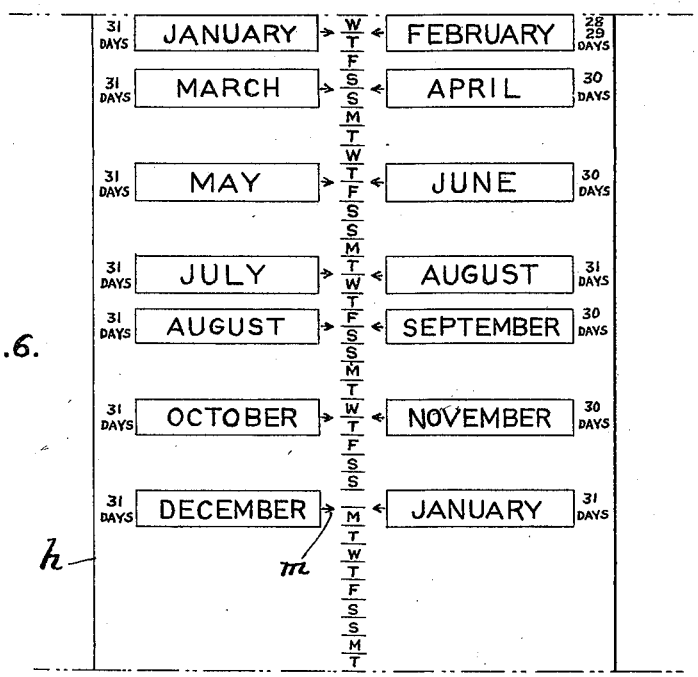

UNITED STATES PATENT OFFICE.

FRANK X. MOERK, OF PHILADELPHIA, PENNSYLVANIA.

PERPETUAL MONTHLY CALENDAR.

1,310,428.      Specification of Letters Patent.      Patented July 22, 1919.

Application filed April 30, 1918. Serial No. 231,574.

*To all whom it may concern:*

Be it known that I, FRANK X. MOERK, a citizen of the United States, residing at Oak Lane, city and county of Philadelphia and State of Pennsylvania, have invented a new and useful Improvement in Perpetual Monthly Calendars, of which the following is a full, clear, and exact description, reference being had to the accompanying drawings, which form a part of this specification.

My invention relates to calendars and particularly to that form thereof known as "perpetual" calendar. The object of the invention is to provide instrumentalities which may be manipulated and adjusted to give a correct calendar for any year, leap year or common. Another object of the invention is to provide a correct calendar for pairs of months of any year. The invention also has for its object to provide for exhibiting the correct number of days for each month.

A preferred embodiment of the invention is shown in the accompanying drawings, in which—

Fig. 3 is a horizontal section.

Fig. 4 is a vertical transverse section through the upper part of the apparatus.

Fig. 5 is a rear view, with the rear wall of the box removed.

Fig. 6 is a developed view of one of the movable strips.

Fig. 7 is a developed view of another of the movable strips.

Fig. 8 is a developed view of a third movable strip.

Figure 1:
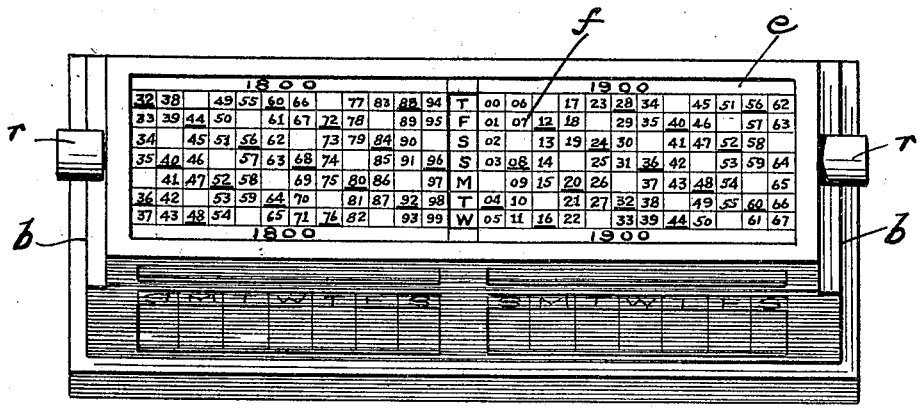
Figure 1 is a front view of the apparatus.

The structure comprises a box-like frame having a base $a$, sides $b$, a partition $c$ connecting the sides between top and bottom, a transparent front $d$ and a transparent top $e$.

Below the top $e$, and visible therethrough, is a stationary table $f$ of numerals representing years. These numerals are arranged in seven horizontal rows extending from side to side of the frame. The table is slotted centrally transversely to the direction of extension of said rows of numerals.

Behind the front $d$, and visible therethrough, is a plate $g$ having two openings $i$, side by side, near its top, for exhibiting the names of a given pair of months and two openings $j$, respectively below the two openings $i$, each for exhibiting numerals representing the days of a month.

$h$ is a movable strip adapted to travel vertically back of the plate $g$ and horizontally (from front to back or from back to front) under the table $f$. The strip $h$ is an endless strip, but it is shown in developed form in Fig. 6. It contains the names of the months arranged side by side in pairs and a row of letters, arranged longitudinally centrally of the strip, representing a multiple series of week days. In place of these letters, the days may be indicated by abbreviations, or they may be printed in full. Opposite each pair of month names is an indicating device $m$ which, in the travel of the strip, may be alined with an indicating device $n$ on the plate $g$.

On the plate $g$, above each opening $j$, is a horizontal row of letters representing the seven days of a week. In place of these letters, the days may be indicated by abbreviations, or they may be printed in full.

$k$ is a strip which is movable at right angles to the strip $h$ and back of the plate $g$ horizontally across the openings $j$. This strip contains numerals representing the days of a month arranged in six horizontal rows and twenty-six vertical rows.

The strip $h$ extends around a fixed guide $o$ and a roller $p$, the axles of the latter turning in bearings in the sides of the frame. Outside the frame the projecting axles have secured thereto knobs $r$ for turning.

Opposite ends of the strip $k$ are connected by cords $s$. This strip extends from the rear of a plate $t$ around its outside edge, thence across the face of the plate, thence back around a roller $v$, thence forward to the inside edge of a plate $u$, and thence across the face of plate $u$ and back of its edge. The cords $s$ extend several turns around the roller $v$ whose axles turn in bearings in the base $a$ and the partition $c$. Beneath the base $a$ the projecting axle has a knob $x$ for turning.

To adjust the calendar the strip $h$ is moved until the two months for which a calendar is desired are brought within the openings $i$, care being taken that the indicators $m$ and $n$ register. Observation is then made of the table $f$ to determine what day of the week on strip $h$ registers with the horizontal row of numerals containing the year for which the calendar is to be set. That day is the first day of the month appearing in the left hand space $i$. The strip $k$ is then moved into position to cause the numeral 1 to appear under said week day. This sets the calendar correctly for both months.

The only exception is in the case of the pair of months January and February in leap years. To correctly adjust the calendar for January and February of leap years, adjust the strip $k$ so that the numeral 1 will appear one day ahead of the day on strip $h$ registering with the year on table $f$.

I have arranged the months in seven, instead of six pairs, by duplicating the months of August and January making each of these two months the right hand month of one pair and the left hand month of another pair. By this arrangement it will be noted that every left hand month contains 31 days, while the right hand months contain variable numbers of days.

It will be noted that an intermediate part of the strip $k$ is concealed from view and extends around the roller $v$. The number of spaces thus concealed is six. It will be noted, in strip $k$, that each numeral 31 of the left hand set of thirteen vertical rows is seven spaces, or a multiple of seven spaces, distant from each numeral 1 of the right hand set. Thereby, and by reason of the fact that each left hand month has 31 days, the correct adjustment of the left hand month effects the automatic adjustment of the right hand month.

Adjacent pairs of months on strip $h$ must be spaced apart a distance equal to a definite number of day spaces on said strip. This distance depends upon the total number of days in the months of the earlier of the two pairs. Thus, the number of days from the first of March to the first of May is 61, or 8 weeks and 5 days. Hence, if the first of March of a given year (say 1917) falls on a Thursday, the first of May of the same year falls on a Tuesday. Now if it be assumed (which is the fact) that when the months of March and April appear in the opening $i$, the abbreviation for Thursday on strip $h$ is in horizontal alinement with the year 1917 in table $f$, it necessarily follows that if the strip $h$ be advanced a distance of five day spaces to bring the abbreviation for Tuesday in alinement with the year 1917 of table $f$, the adjacent pairs of months May and June should be located a distance equal to five day spaces behind the months of March and April in order to make such months appear in the opening $i$. Hence if the months of May and June are brought into said opening, the day of the week on strip $h$ then in horizontal alinement with the year 1917 will necessarily be the first day of May. The distance separating these two pairs of months will not, however, necessarily be five day spaces, but if not it must obviously be five day spaces plus seven or a multiple of seven.

Pursuing the same method of calculating the required distance between the pair of months December and January and the adjacent pair of months January and February, they would be spaced apart a distance of three spaces, or three plus seven, there being four weeks and three days from the first of December to the first of January. In the case of these two pairs of months, however, if the series of day designations is absolutely continuous, they must be spaced apart a distance of only two spaces, or two plus seven or a multiple of seven. This is due to the fact that, in common years, the later year is in a horizontal column on table $f$ one space below the horizontal column containing the earlier year. However, if a blank space is provided in the series of day designations on strip $h$, the location of the January-February pair of months should be moved forward correspondingly. Such a blank space is provided in the strip $h$ as illustrated. Thus, when strip $h$ is moved to bring December and January into opening $i$, the day abbreviation for Saturday appears in alinement with the horizontal year column on table $f$ containing the year 1917. By moving the strip $h$ forward a distance of ten day spaces the abbreviation for Tuesday appears in the column below containing the year 1918 due to the provision of the blank space which, in the last named movement of strip $h$, has passed this year column.

Where, however, the later of the two years is a leap year, which, on table $f$, is located two rows below the preceding year, it is obvious that in moving the ten spaces required to change the months appearing in opening $i$ from December and January to January and February, the first week day of January will aline with the horizontal column of year numerals above the one in which such leap year numeral is contained. Hence, the strip $k$ must be adjusted accordingly, as hereinbefore explained. The operation for any subsequent pair of months in a leap year will be the same, however, as for common years.

Figure 2:
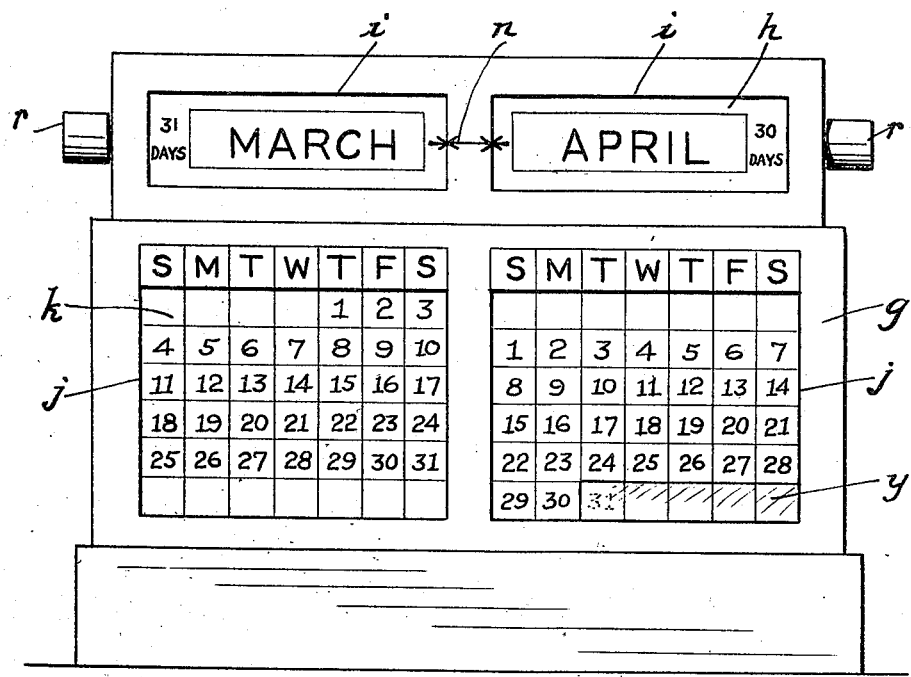
Fig. 2 is a plan view.

One serious objection to the ordinary perpetual calendar is that all the months of the year are represented as containing 31 days. In my calendar I have provided a horizontally movable strip $y$ (see Fig. 8), the ends of which are connected by cords $y'$. This strip is divided into blank squares corresponding to the squares of strip $k$ and is movable transversely across the lower part of strip $k$ so as to cover one, two or three of the numbers at the right hand end of either the fifth or sixth horizontal row of numbers on strip $k$. In Fig. 2, the strip $y$ is shown adjusted to conceal the number 31 appearing under the month of April. The strip $y$ winds about the idler rollers $z'$ and the cords $y$ connecting the ends wind about one of these idlers and the roller $z$, which is turnable by hand to move the strip $y$ back and forth.

Having now fully described my invention, what I claim and desire to protect by Letters Patent is:

1. A calendar comprising a frame having openings for month names and for numerals representing the days of a month, a strip containing such numerals movable across one of said openings, a table of year numerals, and a strip containing month names movable across the other of said openings and containing also week day designations adapted to register with said year numerals.

2. A calendar comprising a frame having openings for month names and for numerals representing the days of a month, a strip containing such numerals movable across one of said openings, a table containing year numerals arranged in rows extending parallel to the direction of movement of said strip, and a strip containing month names movable across the other opening at right angles to the direction of movement of the first strip and of said rows of tables and containing also a longitudinally extending row of week day designations adapted to register with said rows of year numerals.

3. A calendar comprising a frame having a pair of openings in the same plane for names of adjacent months and a pair of openings in the same plane for numerals representing the days of a month, a strip containing names of adjacent months arranged in pairs and movable across the first pair of openings, a strip movable across the other pair of openings transversely to the movement of the first strip, the second strip containing two sets of numerals, the numerals of each set arranged consecutively in horizontal rows, and means to divert the second strip from a straight path in its travel between the two openings of the last named pair.

4. A calendar comprising a frame having a pair of openings for names of adjacent months and a pair of openings for numerals representing the days of a month, a strip containing such numerals movable across the second pair of openings, a table of year numerals, and a strip containing names of adjacent months arranged in pairs movable across the first pair of openings and containing also a longitudinally extending row of week day designations adapted to register with said year numerals.

5. A calendar comprising a frame having a pair of openings for names of adjacent months and a pair of openings for numerals representing the days of a month, a strip containing such numerals movable across the second pair of openings, and a strip containing month names arranged in seven pair of adjacent months, the left hand name of each pair being that of one of the seven thirty-one day months of the year, the last named strip being movable across the first pair of openings.

6. A frame comprising a box-like structure, provided on its top with a table containing year numerals and in its front with an opening for month names and an opening for numerals representing the days of a month, a strip containing such numerals movable horizontally across the second opening, a second strip movable vertically across the first opening and also across the top of the frame, the last named strip containing month names and also week day designations adapted to register with the year numerals of said table, and hand-turnable rollers turning in said frame and connected with said strips.

7. A frame comprising a box-like structure provided at its top with a table containing year numerals arranged in horizontal rows and divided into two sets by a cut-away central portion, said frame provided in its front with two month name openings arranged side by side and two openings for month day numerals arranged side by side beneath the other openings, a strip containing such numerals movable horizontally across the lower pair of openings, a second strip movable across the top of the frame and also across the upper pair of openings and behind the first strip, the second strip containing the names of months arranged in pairs side by side and containing also along its longitudinal central portion a row of week day designations registering with the cut-away portion of the table and adapted to aline with the horizontal rows of year numerals.

In testimony of which invention, I have hereunto set my hand, at Philadelphia, on this 29th day of April, 1918.

FRANK X. MOERK.